Nov. 1, 1949  R. E. TAPP ET AL  2,486,999
PAYING OUT DEVICE FOR AIRCRAFT TOWING
TARGETS, PICKING UP OBJECTS, ETC
Filed July 25, 1945  2 Sheets—Sheet 1
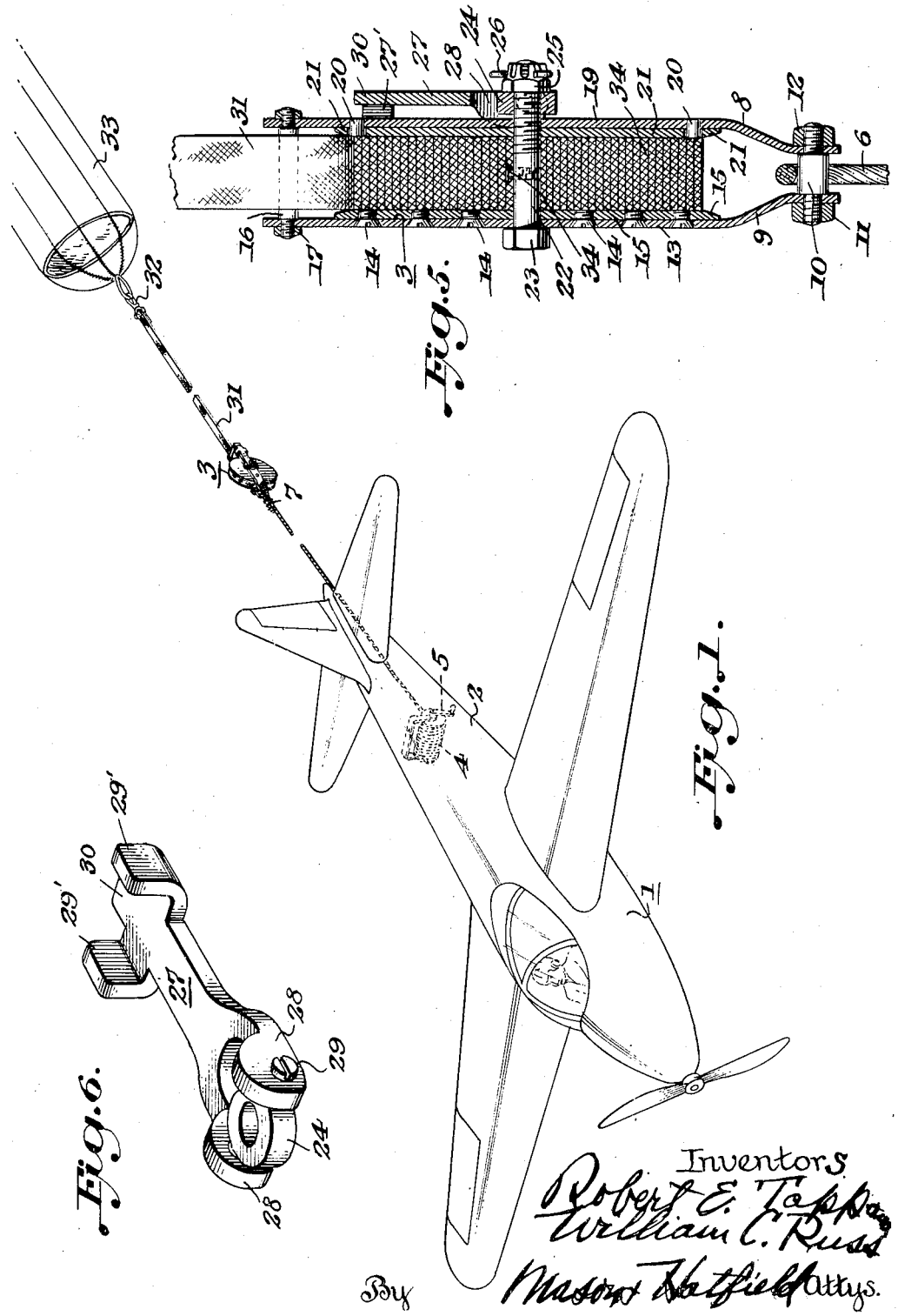

Nov. 1, 1949 R. E. TAPP ET AL 2,486,999
PAYING OUT DEVICE FOR AIRCRAFT TOWING
TARGETS, PICKING UP OBJECTS, ETC
Filed July 25, 1945 2 Sheets-Sheet 2
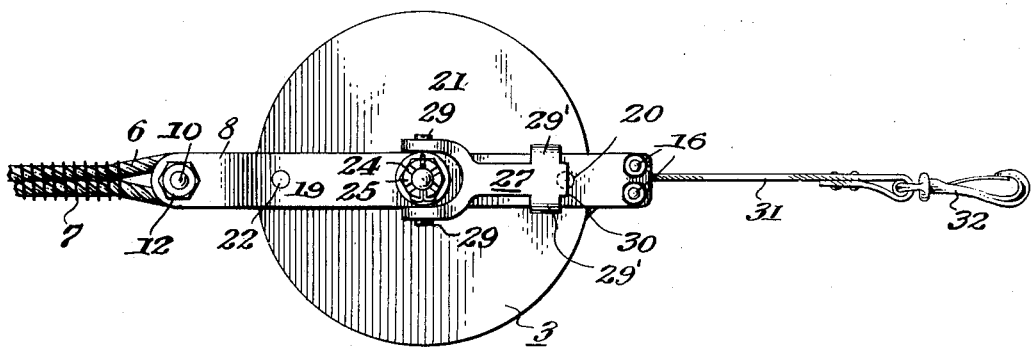
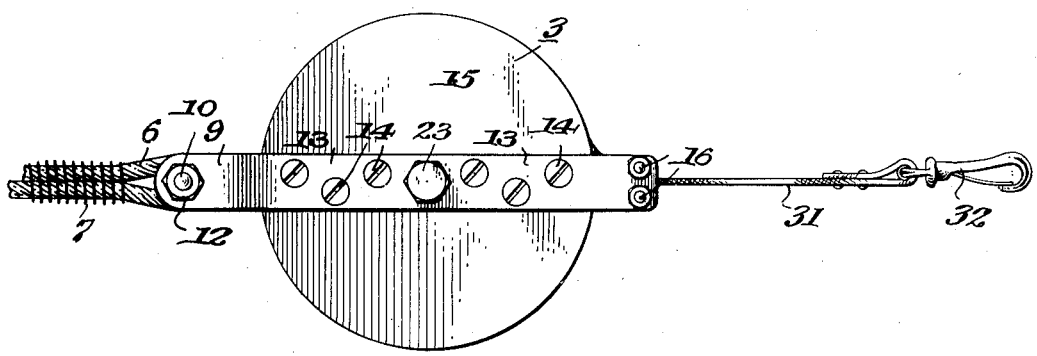
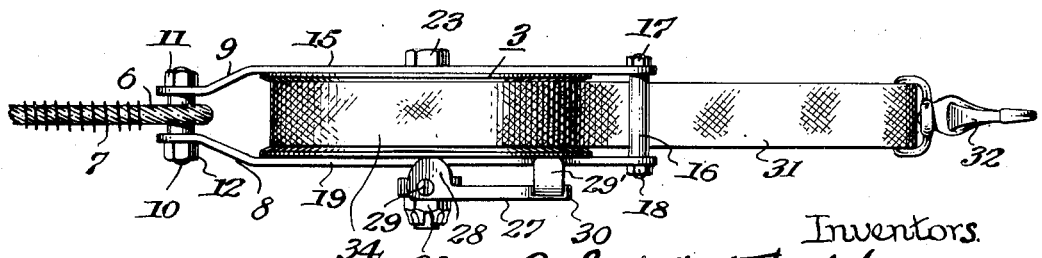
Inventors.
Robert E. Tapp
William C. Russ
By Mason Hatfield attys.

Patented Nov. 1, 1949

2,486,999

UNITED STATES PATENT OFFICE 2,486,999

PAYING OUT DEVICE FOR AIRCRAFT TOWING TARGETS, PICKING UP OBJECTS, ETC.

Robert E. Tapp and William C. Russ, Wilmington, N. C., assignors, by direct and mesne assignments, of one-half to North Carolina Navigation Company, Wilmington, N. C., a limited partnership, and one-half to William B. Mason, Washington, D. C.

Application July 25, 1945, Serial No. 607,020

12 Claims. (Cl. 258—1.2)

This invention relates to a device for assisting in the paying out of a target from an aircraft, or for picking up objects from the ground such as gliders, sacks of mail, or other objects.

One purpose of the invention is to provide a device which may be attached to the tow rope or cable, which cable is wound on a drum mounted in the wing, fuselage or tail of an aircraft, the said device being interposed between the drum and the object to be towed or picked up from the ground.

A further object of the invention is to provide a device which will absorb the shock which takes place incident to the paying out of a target by means of a tow rope wound on a drum and mounted in an aircraft. As the aircraft travels along, the target which is attached to the rope or cable moves to the rear as the cable is payed out from the drum located in the aircraft.

A further object of the invention is to provide a means for absorbing the shock which takes place when a plane in the air picks up an object from the ground.

Other objects will appear hereinafter throughout the specification.

In the drawings:

Figure 1 is a perspective view of an aircraft with the means of this invention attached thereto.

Figure 2 is an elevation of the device taken from the right hand side thereof.

Figure 3 is an elevation of the device taken from the left hand side thereof.

Figure 4 is a top plan view of the invention shown in Figures 2 and 3.

Figure 5 is a horizontal sectional view of the invention shown in Figures 2 to 4.

Figure 6 is a perspective view of the friction regulating means of the device.

This device consists generally of a pair of non-rotatable plates or discs, at least one of which is adjustable toward or from the other disc or plate and held in its adjustable position by suitable means such as the cam means illustrated, and hereinafter to be described. Between these two plates is wound a tape, rope or cable of variable length. One end of the tape is attached to the center stud which passes through the center of the plates, and the other end of the tape is attached to the object to be towed, or to a hook or other device for picking up an object from the ground. The distance between these two plates may be adjusted by means of a cam, such as is shown, or other means of adjustment may be provided. The device itself is attached to the end of a rope or cable which is wound on a drum within an aircraft.

When the device with the tape wound between the plates and the target attached to the end of the tape is dropped through a hole in the wing, fuselage or tail of the plane into space, the target, when caught by the wind, exerts an immediate and sharp pull on the tape. This pull is resisted by the friction of the plates which bear against the convolutions of the tape. However, as the tape progressively pays out or unwinds, friction on the tape becomes progressively less, and by the time all of the tape becomes fully payed out the target or other object being towed reaches substantially the same speed as the towing plane. In other words the speeds of the towing plane and the target gradually become the same, i. e., the difference in speed between the towing plane and the target becomes progressively less as the tape is payed out.

Referring to Figure 1 of the drawings numeral 1 indicates a plane having a fuselage 2. The device of this invention is indicated generally by the numeral 3. The numeral 4 indicates a drum mounted within the fuselage but this drum could be as readily mounted within the wing surfaces or tail surfaces of the plane. The drum is provided with a handle 5 and may be provided with the usual ratchet mechanism, not shown. Wound upon the drum and extending rearwardly of the same is a flexible element or cable 6. The end of the cable is attached at 7 to the device of this invention. This device consists of a pair of straps 8 and 9 fastened together at one of their ends by the shouldered bolt 10 having on its opposite ends threaded nuts 11 and 12 as shown in Figure 5.

The strap 9 has a substantially flat portion 13 provided with a series of apertures for the reception of screws 14 which fixedly hold a circular plate 15 to the strap 9.

The other end of the straps 8 and 9 are held in spaced relation from each other by the shouldered bolts 16 whose opposite ends are threaded to retain the nuts 17 and 18 thereon.

The strap 8 is provided with a flat portion 19. Fixed in the flat portion of the strap 8 are a plurality of pins 20. There is a circular plate 21 provided with apertures into which the pins 20 fit. Located centrally of the plates and freely rotatable therein is the shaft 22 having a hexagonal end 23.

A nut 25 threaded on shaft 22 may be located in adjustable position by the pin 26, as shown in Figure 5.

Referring to Figures 5 and 6, the cam locking member, indicated generally at 27, for adjustably locking the disk 21 in various adjusted positions axially of the shaft, consists of a ring member 24, which, as shown in Figure 6, has an unthreaded aperture, and is held between a pair of cams 28 by the screws 29, as indicated in Figures 2, 4 and 6. The cam member is provided with turned down flanges 29' and a tail piece or handle 30.

As will be appreciated, the cams 28 bear upon the circular plate 21 and when the cam member 27 is turned down to the position indicated in Figures 2, 4 and 5 the cams 28 move the plate 21 to its proper position. In this position of adjustment it frictionally engages the side edges of the wound tape 31. The free end of the tape may be attached to a snap hook 32 which may be snapped onto the ring of the sleeve target 33. The inner end of the tape may be attached by means of the screw threaded stud 34 to the shaft 22.

The cam member 27 may be adjusted to increase or decrease the frictional force exerted by plates 15 and 21 against the side of the tape by means of the threaded nut 25. This nut is rotated on the shaft 22 to a proper position of adjustment and locked in such position by the pin 26. It will be understood that the nut adjusts the ring member 24 and with it the cams 28 axially of the shaft 22. After proper adjustment has been made, the cam member is rotated to its closed or locked position as shown in the drawings.

The device operates as follows:

Assuming it is desired to tow a target such as a sleeve target by means of an aircraft, the air craft takes off with the cable 6 wound entirely upon the drum 4. The tape 31 is also wound upon the shaft 22 and the tension device 3 and target 33 are all located within the fuselage, tail or wing surfaces of the plane, i. e. wherever the drum has been positioned.

When it is desired to release the target the device 3 and target 33 may be dropped through a hole in the fuselage, tail surface or wing surface and the cable 6 payed off the drum 4. Immediately the target is dropped it is picked up by the air stream and a considerable jerk takes place. This jerk or pull is resisted to the maximum extent by the friction exerted by the circular plates 15 and 21. However, the tape 31 gradually pays out between the plates 15 and 21 as the pull continues to be exerted on the target as the air pulls the target rearwardly. At this time the cable 6 may be locked from further movement by means of the usual ratchet (not shown) which forms part of the drum 4.

The pull of the target is resisted by the pull of the plates against the sides of the tape. However, as the target is towed by the aircraft the "pull" of the target causes the tape to pay out. The friction becomes progressively less as the tape pays out between the plates. This is due to two causes, first, there is progressively less tape to be gripped between the plates 15 and 21 as the tape pays out from between these plates, and, second the line of pull becomes more nearly a straight line between the target or other object being towed and the plane. It will be also noted that the line between the end of the tape which is attached to the target and the shaft 22 becomes nearer a straight line as the tape unwinds. It is guided in this unwinding movement by a pair of shouldered bolts 16. It will be appreciated that instead of providing a snap hook 32 any well known means may be provided as a hook for picking up objects from the ground or from other aircraft. In each case the shock or pull incident to the taking hold of the object by the hook will be taken up by the device of the present invention, as will be readily understood.

Instead of the cam locking member 27 other means for adjusting the axial distance between the plates 15 and 21, and hence the amount of friction applied to the sides of the tape, may be provided. This means may take the form of a compression spring mounted on the shaft 22 between plate 21 and adjustable nut 25.

Cable or rope may be substituted for tape 31, but we prefer to use the tape shown in the drawings and described herein.

Other modifications may be adapted which accomplish the purpose of this invention as it is to be understood that the drawings are for illustrative purposes and not for restrictive purposes, and that we desire to be limited only to the extent of the appended claims.

In the claims:

1. In a paying out device for aircraft towing targets, picking up objects, etc., the combination of a drum mounted within said aircraft, flexible means attached to said drum, of snubbing means connected to the end of said flexible means, said snubbing means including a pair of plates, means for adjusting one plate toward the other plate, a second flexible means wound between said plates, the end of said second flexible means having attaching means fastened thereto, and means for winding said drum and for winding in or paying out said snubbing means.

2. In a paying out device for aircraft towing targets, picking up objects, etc., the combination of a drum mounted within said aircraft, flexible means attached to said drum, of snubbing means connected to the end of said flexible means, said snubbing means including a pair of plates, means for adjusting one plate toward the other plate, a second flexible means wound between said plates, the end of said second flexible means having attaching means fastened thereto, and means for preventing rotatable movement of said plates, and means for winding drum and for winding in or paying out said snubbing means.

3. In a paying out device for aircraft towing targets, picking up objects, etc., the combination of a drum mounted within said aircraft, flexible means attached to said drum, of snubbing means connected to the end of said flexible means, said snubbing means including a pair of plates, means for adjusting one plate toward the other plate including cam means, a second flexible means wound between said plates, the end of said second flexible means having attaching means fastened thereto and means for winding said drum and for winding in or paying out said snubbing means.

4. In a paying out device for aircraft towing targets, picking up objects, etc., the combination of a drum mounted within said aircraft, flexible means attached to said drum, of snubbing means connected to the end of said flexible means, said snubbing means including a pair of plates, means for adjusting one plate toward the other plate including cam means, a second flexible means wound between said plates, the end of said second flexible means having attaching means fastened thereto, and means for preventing rotatable movement of said plates, and means for winding said drum and for winding in or paying out said snubbing means.

5. In a paying out device for aircraft towing targets, picking up objects, etc., the combination of a drum mounted within said aircraft, flexible means attached to said drum, of snubbing means connected to the end of said flexible means, said snubbing means including a pair of spaced straps, a first plate fixed to one of said straps, a second plate, means for non-rotatably mounting said second plate on said second strap, means for adjusting said second plate toward and away from said first plate, and means for winding said drum and for winding in or paying out said snubbing means.

6. In a paying out device for aircraft towing targets, picking up objects, etc., the combination of a drum mounted within said aircraft, flexible means attached to said drum, of snubbing means connected to the end of said flexible means, said snubbing means including a pair of spaced straps, a first plate fixed to one of said straps, a second plate, means for non-rotatably mounting said second plate on said second strap, means for adjusting said second plate toward and away from said first plate including cam means, flexible paying out means wound between said first and second plates, and an object holding means attached to the end of said paying out means, and means for winding said drum and for winding in or paying out said snubbing means.

7. In a paying out device for aircraft towing targets, picking up objects, etc., the combination of a drum mounted within said aircraft, flexible means attached to said drum, of snubbing means connected to the end of said flexible means, said snubbing means including a pair of spaced straps, a first plate fixed to one of said straps, a second plate, means for non-rotatably mounting said second plate on said second strap, means for adjusting said second plate toward and away from said first plate including cam means, flexible paying out means wound between said first and second plates, an object holding means attached to the end of said paying out means, said cam means including a shaft and a cam slidably mounted on said shaft and adjustably engaging said second plate, and means for winding said drum and for winding in or paying out said snubbing means.

8. In a paying out device for aircraft towing targets, picking up objects, etc., the combination of a drum mounted within said aircraft, flexible means attached to said drum, of snubbing means connected to the end of said flexible means, said snubbing means including a pair of spaced straps, a first plate fixed to one of said straps, a second plate, means for non-rotatably mounting said second plate on said second strap, means for adjusting said second plate toward and away from said first plate including cam means, flexible paying out means wound between said first and second plate, an object holding means attached to the end of said paying out means, said cam means including a rotatable shaft and a cam slidably mounted on said shaft and adjustably engaging said second plate.

9. In a paying out device for aircraft towing targets, picking up objects, etc., the combination of a drum mounted within said aircraft, flexible means attached to said drum, of snubbing means connected to the end of said flexible means, said snubbing means including a pair of spaced straps, a first plate fixed to one of said straps, a second plate, means for non-rotatably mounting said second plate on said second strap, means for adjusting said second plate toward and away from said first plate including cam means, flexible paying out means wound between said first and second plate, an object holding means attached to the end of said paying out means, said cam means including a rotatable shaft and a cam slidably mounted on said shaft and adjustably engaging said second plate, and means for adjustably positioning said cam along said shaft.

10. In a paying out device for aircraft towing targets, picking up objects, etc., the combination of a drum mounted within said aircraft, flexible means attached to said drum, of snubbing means connected to the end of said flexible means, said snubbing means including a pair of straps, means spacing apart the ends of said straps, a first circular plate, means fixedly attaching said plate to one of said straps, a second circular plate, pins on said other strap, apertures in said second plate engaged by said pins for preventing rotation thereof, a shaft extending from said straps and plates, cam means mounted on said shaft and adapted to bear against said second plate whereby to adjust said second plate toward said first plate, a flexible tape having one of its ends attached to said shaft, and means on the opposite end of said tape for attaching the same to an object.

11. In a paying out device for aircraft towing targets, picking up objects, etc., the combination of a drum mounted within said aircraft, flexible means attached to said drum, of snubbing means connected to the end of said flexible means, said snubbing means including a pair of straps, means spacing apart the ends of said straps, a first circular plate, means fixedly attaching said plate to one of said straps, a second circular plate, pins on said other strap, apertures in said second plate engaged by said pins for preventing rotation thereof, a shaft extending from said straps and plates, cam means mounted on said shaft and adapted to bear against said second plate whereby to adjust said second plate toward said first plate, a flexible tape having one of its ends attached to said shaft, means on the opposite end of said tape for attaching the same to an object, said cam means including a ring member slidably mounted on said shaft, a pair of cams attached to said ring member and bearing against said second plate, and a handle on said plate for actuating said cams.

12. In a paying out device for aircraft towing targets, picking up objects, etc., the combination of a drum mounted within said aircraft, flexible means attached to said drum, of snubbing means connected to the end of said flexible means, said snubbing means including a pair of straps, means spacing apart the ends of said straps, a first circular plate, means fixedly attaching said plate to one of said straps, a second circular plate, pins on said other straps, apertures in said second plate engaged by said pins for preventing rotation thereof, a shaft extending from said straps and plates, cam means mounted on said shaft and adapted to bear against said second plate whereby to adjust said second plate toward said first plate, a flexible tape having one of its ends attached to said shaft, means on the opposite end of said tape for attaching the same to an object, said cam means including a ring member slidably mounted on said shaft, a pair of cams attached to said ring member and bearing against said second plate, a handle on said plate for actuating said cams, and adjustable means on said shaft for adjusting said ring member and said cams along said shaft.

ROBERT E. TAPP.
WILLIAM C. RUSS.

REFERENCES CITED

The following references are of record in the file of this patent:

UNITED STATES PATENTS

| Number | Name | Date |
| --- | --- | --- |
| 1,458,710 | Kolczewski | June 12, 1923 |
| 1,755,235 | Ashley et al. | Apr. 22, 1930 |

FOREIGN PATENTS

| Number | Country | Date |
| --- | --- | --- |
| 614,264 | France | Sept. 13, 1926 |